United States Patent
Houraiya (10) Patent No.: US 11,390,241 B2
(45) Date of Patent: *Jul. 19, 2022

(54) NON-COATED AIRBAG FABRIC AND AIRBAG

(71) Applicant: SEIREN CO., LTD., Fukui (JP)

(72) Inventor: Tsuyoshi Houraiya, Fukui (JP)

(73) Assignee: SEIREN CO., LTD., Sukui (JP)

( * ) Notice: Subject to any disclaimer, the term of this patent is extended or adjusted under 35 U.S.C. 154(b) by 90 days.

This patent is subject to a terminal disclaimer.

(21) Appl. No.: 16/651,773

(22) PCT Filed: Sep. 27, 2018

(86) PCT No.: PCT/JP2018/036072
§ 371 (c)(1),
(2) Date: Mar. 27, 2020

(87) PCT Pub. No.: WO2019/065896
PCT Pub. Date: Apr. 4, 2019

(65) Prior Publication Data
US 2020/0254957 A1    Aug. 13, 2020

(30) Foreign Application Priority Data

Sep. 28, 2017 (JP) ............................ JP2017-189237

(51) Int. Cl.
*B60R 21/235* (2006.01)
*D03D 1/02* (2006.01)
*D03D 15/283* (2021.01)

(52) U.S. Cl.
CPC ............. *B60R 21/235* (2013.01); *D03D 1/02* (2013.01); *D03D 15/283* (2021.01); *B60R 2021/23509* (2013.01); *B60R 2021/23538* (2013.01); *D10B 2331/02* (2013.01); *D10B 2331/04* (2013.01); *D10B 2505/124* (2013.01); *Y10T 442/30* (2015.04)

(58) Field of Classification Search
None
See application file for complete search history.

(56) References Cited

U.S. PATENT DOCUMENTS

| | | |
|---|---|---|
| 6,182,709 B1 | 2/2001 | Konishi et al. |
| 2003/0008582 A1 | 1/2003 | Koketsu et al. |
| 2013/0089725 A1 | 4/2013 | Jung et al. |
| 2015/0084319 A1 | 3/2015 | Matsui et al. |
| 2018/0281737 A1 | 10/2018 | Houraiya |
| 2019/0218692 A1 | 7/2019 | Kodera et al. |

FOREIGN PATENT DOCUMENTS

| | | |
|---|---|---|
| CN | 1388842 A | 1/2003 |
| CN | 104284815 A | 1/2015 |
| EP | 0976857 A1 | 2/2000 |
| EP | 3517667 A1 | 7/2019 |
| JP | 6-146132 A | 5/1994 |
| JP | 6-184856 A | 7/1994 |
| JP | 6-264328 A | 9/1994 |
| JP | 7-54238 A | 2/1995 |
| JP | 8-11660 A | 1/1996 |
| JP | 10-219543 A | 8/1998 |
| JP | 2008-214834 A | 9/2008 |
| JP | 2013-528719 A | 7/2013 |
| JP | 2015-104998 A | 6/2015 |
| JP | 2015-110857 A | 6/2015 |
| WO | WO 2017/057300 A1 | 4/2017 |
| WO | WO 2018/062333 A1 | 4/2018 |

OTHER PUBLICATIONS

Chinese Office Action and Search Report for Chinese Application No. 201880062641.6, dated Feb. 2, 2021, with English translation.
International Search Report (PCT/ISA/210) issued in PCT/JP2018/036072, dated Dec. 4, 2018.
Extended European Search Report for European Application No. 18863214.5, dated Jun. 7, 2021.
International Third Party Observation for International Application No. PCT/JP2018/036072, dated Nov. 21, 2019.
Chinese Office Action and Search Report (including an English translation thereof) issued in the corresponding Chinese Patent Application No. 201880062641.6 dated Sep. 3, 2021.

*Primary Examiner* — Arti Singh-Pandey (74) *Attorney, Agent, or Firm* — Birch, Stewart, Kolasch & Birch, LLP (57) ABSTRACT

A non-coated air bag fabric is a fabric constituted by synthetic fibers, and the fabric has a cover factor of 2300 or more, a height difference between a recess and a protrusion on a surface of the fabric is less than 130 μm, and a P ratio expressed by the following equation is 0.85 to 1.15 inclusive. The P ratio=$HP_{100}/HP_{80}$ where $HP_{80}$ indicates air permeability after a load is applied to the fabric under a condition of 80° C., and $HP_{100}$ indicates air permeability after a load is applied to the fabric under a condition of 100° C.

7 Claims, 4 Drawing Sheets

NON-COATED AIRBAG FABRIC AND AIRBAG

TECHNICAL FIELD

The present invention relates to a fabric used in an air bag that is widely used as an occupant protection device at the time of vehicle collision, and particularly to a non-coated air bag fabric and an air bag obtained from the same.

BACKGROUND ART

Air bag devices are commonly provided in a vehicle as a safety device for occupant protection that protects an occupant from impact upon vehicle collision. Conventionally, in order to prevent gas released from an inflator from leaking from the bag, fabric coated with a resin material was mainly used, but fabric needs to be light in weight due to demands for improvements in fuel consumption and the like and needs to be compactly housed due to trends in steering wheel design and the like, and thus non-coated fabric has been widely adopted.

However, the structure of non-coated fabric is more likely to collapse when an air bag is deployed, compared to coated fabric. Thus, there is the issue that gas for filling the inner portion of the air bag will be released to the outside of the air bag through portions where the structure has collapsed. Also, because a lightweight and compact module is required as an air bag, an inflator thereof has been reduced in size. As a result, it is inevitable that the temperature of gas released from the inflator becomes higher than ever, and a phenomenon in which the peripheries thereof are melted when high-temperature gas passes through collapsed portions of the structure as described above is observed.

To address these issues, Patent Literature 1 discloses a method for obtaining a non-coated air bag base material having low air permeability and high heat resistance by irradiating woven fabric with an electron beam to scientifically crosslink the base material, for example. However, it is difficult to say that the fabric is evenly irradiated with an electron beam, and as a result, if unevenness occurs in crosslinking, there is a risk that the load at the time of expansion will not be uniform and the structure will collapse, resulting in gas leakage or the like.

Also, Patent Literature 2 discloses use of a sewing thread provided with thermoplastic resin. A technique is disclosed by which, if such a sewing thread is used, the sewing thread is melted through heating after sewing, and thus sewing holes can be covered by the molten thermoplastic resin, thus preventing gas leakage. However, there is the issue that it is difficult to evenly heat the entire bag, and thus the state of shrinkage of the yarns varies in the bag due to this heating unevenness. As a result, there is a risk that the load at the time of expansion will not be uniform, and the structure of sewn portions thereof will collapse, resulting in gas leakage or the like.

CITATION LIST

Patent Literature

Patent Literature 1: JP H6-146132A
Patent Literature 2: JP 2015-104998A

SUMMARY OF INVENTION

Technical Problem

An object of the present invention is to provide a non-coated air bag fabric having good durability at sewn portions, and excellently low air permeability even under high-temperature conditions, and an air bag made of the same, without special processing.

Solution to Problem

That is, a non-coated air bag fabric of the present invention is woven using fibers constituted by synthetic fibers, and the fabric has a cover factor of 2300 or more, a height difference between a recess and a protrusion on a surface of the fabric is less than 130 μm, and a P ratio expressed by an equation below is 0.85 to 1.15 inclusive, $$P\ \text{ratio} = HP_{100}/HP_{80},$$

where $HP_{80}$ indicates air permeability after a load is applied to the fabric under a condition of 80° C., and
$HP_{100}$ indicates air permeability after a load is applied to the fabric under a condition of 100° C.

Also, it is preferable that the synthetic fibers are polyester fibers.

Also, an air bag according to the present invention is formed by at least one piece of main body base cloth formed by the above-described non-coated air bag fabric.

Advantageous Effects of Invention

According to the present invention, it is possible to provide a non-coated air bag fabric having good heat resistance and excellently low air permeability even under high-temperature conditions, and an air bag made of the same, without special processing.

DESCRIPTION OF EMBODIMENTS

A non-coated air bag fabric of the present invention is characterized mainly by having a cover factor of 2300 or more, a height difference between a recess and a protrusion on a surface of the fabric being less than 130 μm, and a P ratio expressed by the following equation being 0.85 to 1.15 inclusive, $$\text{the } P\ \text{ratio} = HP_{100}/HP_{80},$$

where $HP_{80}$ indicates air permeability after a load is applied to the fabric under a condition of 80° C., and
$HP_{100}$ indicates air permeability after a load is applied to the fabric under a condition of 100° C.

Hereinafter, this fabric will be described in more detail. First, it is important that the cover factor of the fabric is 2300 or more. By setting the cover factor to 2300 or more, gaps between weaving yarns are small and excellently low air permeability can be obtained. From this point of view, the cover factor is preferably 2400 or more, more preferably 2500 or more, and particularly preferably 2600 or more. On the other hand, it is preferable that the cover factor is 2800 or less because the flexibility of the fabric is unlikely to be impaired and the fabric become compact when the fabric is folded. Note that a cover factor is a value calculated using the equation below in the present invention.

Cover factor=warp density of fabric×√total fineness of warp+weft density of fabric×√total fineness of weft Also, it is important that the height difference between recesses and protrusions on a surface of the fabric is less than 130 μm, more preferably less than 120 μm, and even more preferably less than 110 μm. By setting the height difference to be less than 130 μm, the surface of the fabric becomes even and the load becomes uniform when the air bag has expanded, and thus localized structural collapse is unlikely to occur. That is, it is possible to inhibit a decrease in air permeability under high-temperature conditions. Note that the height difference between recesses and protrusions on the surface of the fabric can be obtained using a surface roughness measuring device. The entire surface of the fabric is fixed to a flat surface using double-sided tape, and then the height difference between recesses and protrusions on the surface of the fabric can be measured using a surface roughness measuring device, for example.

Note that although the height difference is affected by the total fineness, the single fiber, the density, and the like, if the density is low, the height difference is likely to be low.

Also, it is necessary to take balance between the height difference and the cover factor into consideration, and even if the height difference is high, if the cover factor is also high, it is possible to inhibit a decrease in air permeability under high-temperature conditions. Thus, if the height difference is 120 μm or more, for example, the cover factor is preferably 2550 or more, and more preferably 2600 or more. On the other hand, if the height difference is less than 115 μm, the cover factor may be low, and may be less than 2500, and be 2400 or less, for example.

Also, it is important that the above-described P ratio of the fabric is 0.85 to 1.15 inclusive, and is more preferably 0.90 or more. That is, a difference in air permeability is preferably small even if a temperature difference arises in a state in which a load is applied to the fabric. Accordingly, it is possible to reduce damage caused by the load applied to sewn portions (portions located near sewing holes at which the fabric is sewn). Although fibers of the fabric are softened or shrunk by heat, it is conceivable that when the P ratio is smaller than 1, for example, air permeability at a high temperature is lower than air permeability at a low temperature, and in this case, the air permeability at a high temperature is low due to fibers shrinking more at a high temperature than at a low temperature. On the other hand, it is conceivable that when the P ratio is 1 or more, air permeability at a low temperature is lower than air permeability at a high temperature, and in this case, the air permeability at a low temperature is low due to fibers shrinking more at a low temperature than at a high temperature. Also, it is conceivable that when the P ratio is 0.85 to 1.15 inclusive, balance between shrinkage and softening is somewhat is maintained, and neither shrinkage nor softening will have a significant effect. As a result of the P ratio being 0.85 or more, when the temperature of the inside of the bag is high, the load is not concentrated at sewn portions, and the heat resistance of the sewn portions is increased. That is, damage to the sewn portions is reduced. In contrast, it is conceivable that when the P ratio is smaller than 0.85, fibers excessively shrink at a high temperature and stress cannot be reduced when the internal pressure increases, and thus there is a risk that stress will be concentrated at sewn portions, resulting in damage. Also, as a result of the P ratio being 1.15 or less, even if the temperature of the inside of the bag is high, air permeability of the bag surface does not significantly increase, compared to the case where the temperature thereof is low, and a stable internal pressure can be obtained. In contrast, it is conceivable that if the P ratio is larger than 1.15, fibers are excessively softened at a high temperature, and thus there is a risk that airtightness will decrease.

Note that the above-described $HP_{80}$ refers to air permeability after a load is applied by a tension of 20 kgf for 1 minute each in the warp direction and the weft direction while the fabric is disposed in a thermostatic bath, for example. Similarly, the $HP_{100}$ refers to air permeability after a load is applied by a tension of 20 kgf for 1 minute each in the warp direction and the weft direction while the fabric is disposed in the thermostatic bath, for example. Also, air permeability refers to air permeability measured using a Frazier method, which will be described later. However, there is no particular limitation on the magnitude of a load, and the load may be any value other than 20 kgf.

Note that it is conceivable that the P ratio is affected by single fiber fineness. It is conceivable that if the single fiber fineness is large, fibers are more likely to shrink, and thus the P ratio is likely to decrease, for example. On the other hand, it is conceivable that if the single fiber fineness is small, fibers are likely to be softened, and thus the P ratio is likely to increase, for example.

With regard to the air permeability of the fabric of the present invention, air permeability that is measured using a Frazier method is preferably 0.5 ml/cm$^2$·sec or less, and more preferably 0.3 ml/cm$^2$·sec or less. By setting the air permeability to be the above-described value, if a base cloth for an airbag is formed using the fabric of the present invention, gas leakage from the surface of this base cloth is reduced, the size of an inflator can be reduced, and quick deployment is possible.

Yarns that constitute the fabric of the present invention preferably have a total fineness of 280 dtex or more. If the total fineness of yarns is 280 dtex or more, the strength of the fabric becomes more superior as an air bag. Also, the total fineness is preferably 560 dtex or less and more preferably 470 dtex or less because a lightweight fabric can be easily obtained.

A synthetic fiber for constituting the fabric of the present invention is selected from the group of aliphatic polyamide fibers such as nylon 6 and nylon 66, and polyester fibers such as polyethylene terephthalate, polytrimethylene terephthalate, polybutylene terephthalate, and polyethylene naphthalate fibers. Among these, polyester fibers are preferable in terms that the height difference is unlikely to change due to the influence of humidity or temperature.

Yarns that constitute the fabric may be the same or different from each other. The fabric may be constituted by yarns having different single fiber finenesses (=total fineness/the number of filaments), for example. Specifically, for example, it is preferable to use a yarn that has a single fiber fineness of 1.0 to 3.5 dtex, and a yarn having a single fiber fineness of 2.0 to 3.0 dtex is more preferable, and a yarn having a single fiber fineness of 2.5 to 3.0 dtex is particularly preferable. By setting the single fiber fineness to 3.5 dtex or less, it is possible to increase the flexibility of the fabric, improve the foldability of the air bag, and also reduce the air permeability. Also, the single fiber fineness is preferably 1.0 dtex or more because the single fibers are unlikely to break in the spinning process, the weaving process, or the like.

Also, it is sufficient that the cross-sectional shape of a single fiber is selected from a circle, an ellipse, a flattened shape, a polygon, a hollow shape, other variants, and the like. It is sufficient to use mixed fibers, doubling yarns, combined use yarns, mixed use yarns thereof (the warp and the weft have different cross-sectional shapes), or the like as needed, and to appropriately select the cross-sectional shape to the extent that the spinning process, the fabric production process, the fabric physical properties, and the like are not hindered.

One or more of various additives that are usually used to improve spinnability, processability, durability, and the like of fibers may be used for these fibers, examples including a heat-resistant stabilizer, an antioxidant, a light-resistant stabilizer, an aging resister, a lubricant, a smoothing agent, a pigment, a water repellent agent, an oil-repellent agent, a masking agent such as titanium oxide, a gloss imparting agent, a flame retardant, and a plasticizer.

The structure of the fabric may be any of a plain weave, a basket weave, a grid weave (ripstop weave), a twill weave, a cord weave, a leno weave, a mock leno weave, and a composite structure thereof. Beside a two-axis design with warp and weft, a multi-axis design including axes that are inclined at 60 degrees may be adopted as needed, and in this case, the arrangement of yarns need only be in conformity with the same arrangement of the warp or the weft. Among these, plain weave is preferable in terms of ensuring the tightness of the structure, the physical properties, and the evenness of the performance.

The weave densities of the warp and the weft of the fabric are each preferably 48 to 68/2.54 cm in terms of performance such as the weavability and air permeability.

An air bag of the present invention can be obtained by joining at least one piece of main body base cloth obtained by cutting the fabric of the present invention into a desired shape. All pieces of main body base cloth that constitute the air bag are preferably constituted by the fabric, or a portion thereof may be constituted by the fabric. Also, it is sufficient to select the specifications, shape, and volume of the air bag in accordance with the site at which the air bag is to be disposed, the application, housing space, the performance of absorbing occupant impact, the output of the inflator, and the like. Furthermore, a reinforcement cloth may be added according to required performance, and a non-coated fabric that is equivalent to the main body base cloth, a non-coated fabric that is different from the main body base cloth, or a fabric that is coated with a resin and is different from the main body base cloth may be selected as the base cloth used as the reinforcement cloth.

Although joining of the main body base cloths, joining of a main body base cloth and a reinforcement cloth or a hanging string, and fixing of other cut base cloths are performed mainly by sewing, it is possible to use partial adhesion, welding, or the like in combination, or use a joining method employing weaving or knitting. That is, there is no particular limitation on the joining method as long as the air bag has satisfactory durability, impact resistance at the time of deployment, the performance of absorbing occupant impact, and the like.

It is sufficient that cut base cloths are sewn together using a sewing method that is applied to a general air bag, such as lock stitches, multi-thread chain stitches, one side down stitches, looping, safety stitches, zigzag stitches, flattened stitches, or the like. Also, it is sufficient that the fineness of the sewing thread is 700 dtex (corresponding to #20) to 2800 dtex (corresponding to #0), and the stitch count is 2 to 10 stitches/cm. If stitch lines with a plurality of columns are required, it is sufficient to use a multi-needle sewing machine with the distance between stitch lines being about 2 mm to 8 mm, but if the distance of a sewn portion is not long, sewing may be performed using a single-needle sewing machine a plurality of times. If a plurality of base cloths are used as an air bag body, a plurality of base cloths maybe sewn together in a stacked state, or sewn together one by one.

It is sufficient that the sewing thread used for sewing is selected as appropriate from among threads that are generally called synthetic threads and threads that are used as industrial sewing threads. Examples thereof include nylon 6, nylon 66, nylon 46, polyester, macromolecular polyolefin, fluorine containing, vinylon, aramid, carbon, glass, and steel yarns, and any of a spun yarn, a filament twisted yarn, or a filament resin processed yarn may be used.

Furthermore, in order to prevent gas leakage from stitches of outer circumferential sewn portions or the like, a sealing material, an adhesive, an adhering material, or the like may be applied to, sprayed onto, or stacked on upper portions and/or lower portions of stitches, gaps between stitches, a margin to seam, or the like.

The air bag of the present invention can be applied to applications in passenger cars, commercial vehicles, buses, motorcycles, and the like as various bags for occupant protection, such as side bags and center bags for front collision protection and side collision protection of a driver/passenger seat, headrest bags for rear seat occupant protection (front collision and rear collision) and headrest bags for rear collision protection, knee bags and foot bags for leg and foot protection, mini bags for infant protection (child seats), bag bodies for an air belt, and bags for pedestrian protection, and furthermore, as long as the function requirements are satisfied, the air bag of the present invention can be applied in multiple applications such as ships, railroad trains, electric railcars, aircraft, and amusement park equipment.

WORKING EXAMPLES

Hereinafter, the present invention will be more specifically described based on working examples, but the present invention is not limited to these working examples. Note that methods for evaluating the properties and performance of a fabric for an air bag will be described below, the evaluation being made in the working examples.

Total Fineness of Yarns

Measurement was performed in conformity with method B in JIS L 1013 8.3.1.

Number of Yarn Filaments

Measurement was performed in conformity with JIS L 1013 8.4.

Single Fiber Fineness

The single fiber fineness was obtained by dividing the total fineness of yarns by the number of yarn filaments.

Weave Density of Fabric

Measurement was performed in conformity with method A in JIS L 1096 8.6.1.

Thickness of Fabric

Measurement was performed in conformity with method A in JIS L 1096 8.4.

Height Difference between Recesses and Protrusions on Surface of Fabric

Recesses and protrusions on the surface of the obtained fabric were measured using a CNC surface roughness measuring machine (SV-3000CNC) manufactured by MITSU-TOMO. Co., Ltd. The obtained fabric was cut into 50 mm×50 mm pieces, and the resulting pieces were used as samples for measurement, the samples being collected from five positions that were located 200 mm or more apart from each other in the width direction of the cloth. A sample was placed on a stage of a surface roughness meter in a state in which the entire surface of the sample was adhered to a glass plate using double-sided tape (manufactured by 3M Company, KRE-19). A stylus whose leading end had a radius of 0.002 mm was set on the sample and was linearly moved in a state in which the stylus was in contact with the surface of the cloth at a pressing force of 0.75 mN, and the distance the stylus moved in the up-down direction was measured and the obtained distance was deemed as the unevenness state of the surface. Measurement conditions were set such that the measurement length was 10 mm, the measurement speed was 0.1 mm/sec, and the measurement pitch was 0.001 mm. As a result of performing measurement five times while changing the measurement position of one sample, the results of 25 measurements were obtained from one level of the fabric. A difference between the maximum point and the minimum point in each of the results of measurements was obtained, and an average thereof was deemed to be the height difference between recesses and protrusions on the surface.

Air Permeability of Fabric

Measurement was performed in conformity with method A (Frazier method) in JIS L 1096 8.26.1.

P Ratio of Fabric

The obtained fabric was cut into 120 mm×120 mm pieces, and the pieces of the fabric were identified to understand the warp direction and the weft direction thereof. The obtained cut pieces were placed in a thermostatic bath set to 80° C. for 30 minutes or more, and then a load of 20 kgf was applied thereto for 1 minute each in the warp direction and the weft direction of the fabric without removing the pieces from the thermostatic bath. The load was applied using the Autograph (AG-IS type MO manufactured by SHIMADZU CORPORATION) under the condition that the distance of the grips was 100 mm. After the load was applied, the air permeability was measured in conformity with method A (Frazier method) in JIS L 1096 8.26.1, and air permeability after a high-temperature load (80° C.): $HP_{80}$ was obtained. Then, the thermostatic bath was set to 100° C., the load was applied and the air permeability was measured in the same manner, and air permeability after a high-temperature load (100° C.): $HP_{100}$ was obtained. The P ratio was obtained by dividing the obtained $HP_{80}$ by the obtained $HP_{100}$.

Method for Producing Air Bag for Evaluation

A method for producing an air bag for evaluation will be described below with reference to FIGS. 1 to 4. A first circular main body base cloth 1 having a diameter of 702 mm and a second circular main body base cloth 2 having a diameter of 702 mm were cut from a prepared fabric. The first main body base cloth 2 was provided, at its central portion, with an inflator mounting port 3 having a diameter of 67 mm and two air outlets 4 having a diameter of 30 mm at two positions (left and right pair) located 125 mm upward of and 115 mm respectively to the left and right from the center of the mounting port 3. Furthermore, the first main body base cloth 1 was provided with bolt fixing holes 5 having a diameter of 5.5 mm at positions located 34 mm upward and downward of and 34 mm to the left and to the right from the center of the mounting port 3 (see FIG. 1). Note that the second main body base cloth 2 is arranged on the occupant side, and was not provided with a mounting port, air outlets, or bolt fixing holes.

Also, a non-coated base cloth that was produced using 470 dtex, 72f nylon 66 fibers and had a weave density of 53/2.54 cm and a coated base cloth that was obtained by coating a base cloth, which was obtained using 470 dtex, 72f nylon 66 fibers and had a weave density of 46/2.54 cm, with a silicone resin at 45 g/m² were prepared as the reinforcement cloths. As the reinforcement cloths for the inflator mounting port 3, three pieces of annular cloth 6a having an outer diameter of 210 mm and an inner diameter of 67 mm were cut from the non-coated base cloth, and one piece of annular cloth 6b having the same shape as the annular cloth 6a was cut from the coated base cloth.

Figure 1:
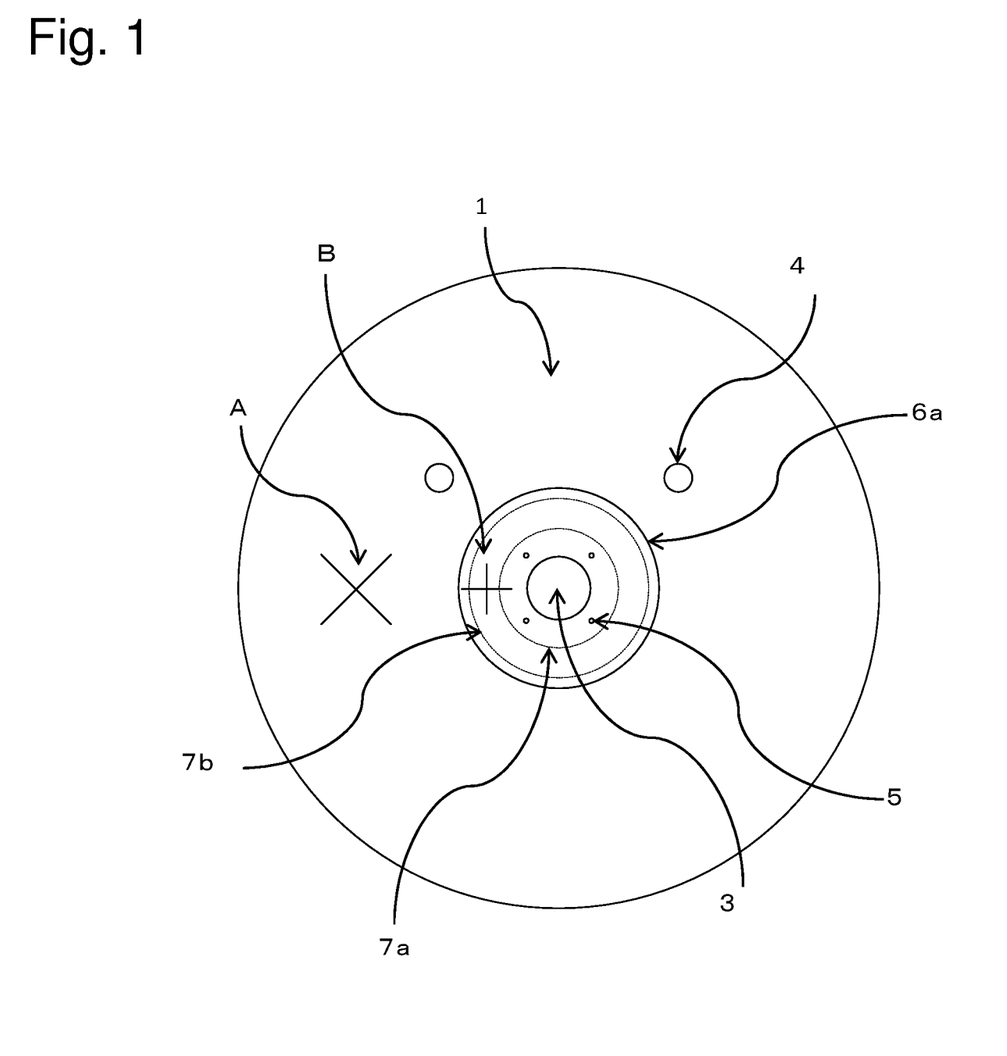
FIG. 1 is a front view showing a state in which three pieces of annular cloth are sewn to a mounting port-side main body base cloth of an air bag for evaluation.
Figure 2:
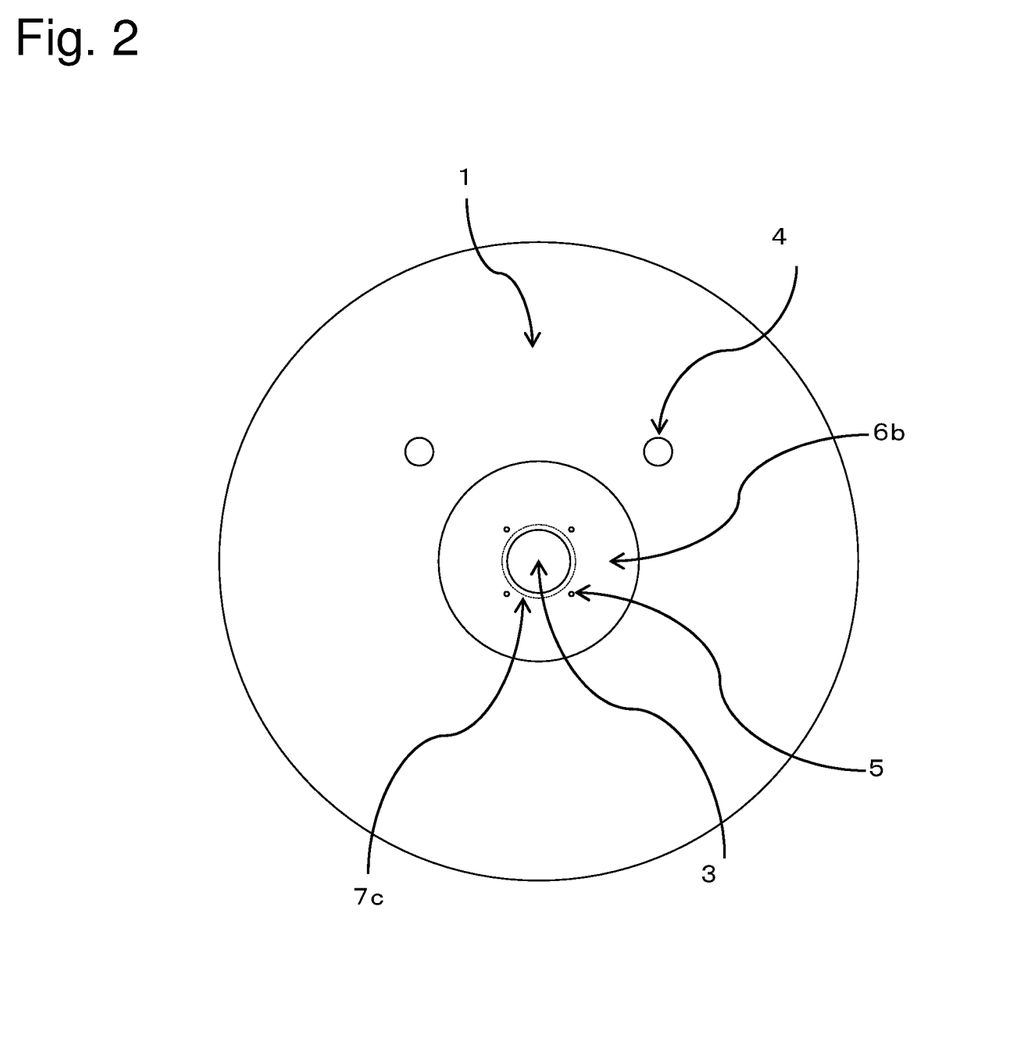
FIG. 2 is a front view showing a state in which four pieces of annular cloth are sewn to the mounting port-side main body base cloth of the air bag for evaluation.

All of the pieces of annular cloth 6a and 6b were provided with bolt fixing holes having a diameter of 5.5 mm at positions corresponding to the bolt fixing holes 5 of the first main body base cloth 1. Also, the three pieces of annular cloth 6a were overlaid on the main body base cloth 1 provided with the inflator mounting port 3 such that the weaving direction of the reinforcement cloth was rotated by 45 degrees with respect to the weaving direction of the main body base cloth 1 (see weaving directions A and B in FIG. 1) and the positions of the bolt fixing holes coincided with each other. Here, A shown in FIG. 2 indicates the weaving direction of the first main body base cloth 1 and B indicates the weaving direction of the pieces of annular cloth. The pieces of cloth were sewn in a circular shape at positions at a diameter of 126 mm (sewn portion 7a) and at a diameter of 188 mm (sewn portion 7b) with the mounting port 3 serving as the center. Furthermore, similarly to the pieces of annular cloth 6a, the piece of annular cloth 6b having the same shape as the pieces of annular cloth 6a was overlaid thereon with the same weaving direction as the pieces of annular cloth 6a from the above, and the four pieces of annular cloth 6a and 6b were sewn to the main body base cloth 1 in a circular shape at a position at a diameter of 75 mm (sewn portion 7c). The main body base cloth 1 after sewing is shown in FIG. 2. Note that the pieces of annular cloth were seamed with the main body base cloth 1 through lock stitching using a nylon 66 sewing thread with the needle thread being 1400 dtex and the bobbin thread being 940 dtex with a stitch count of 3.5 stitches/cm.

Figure 3:
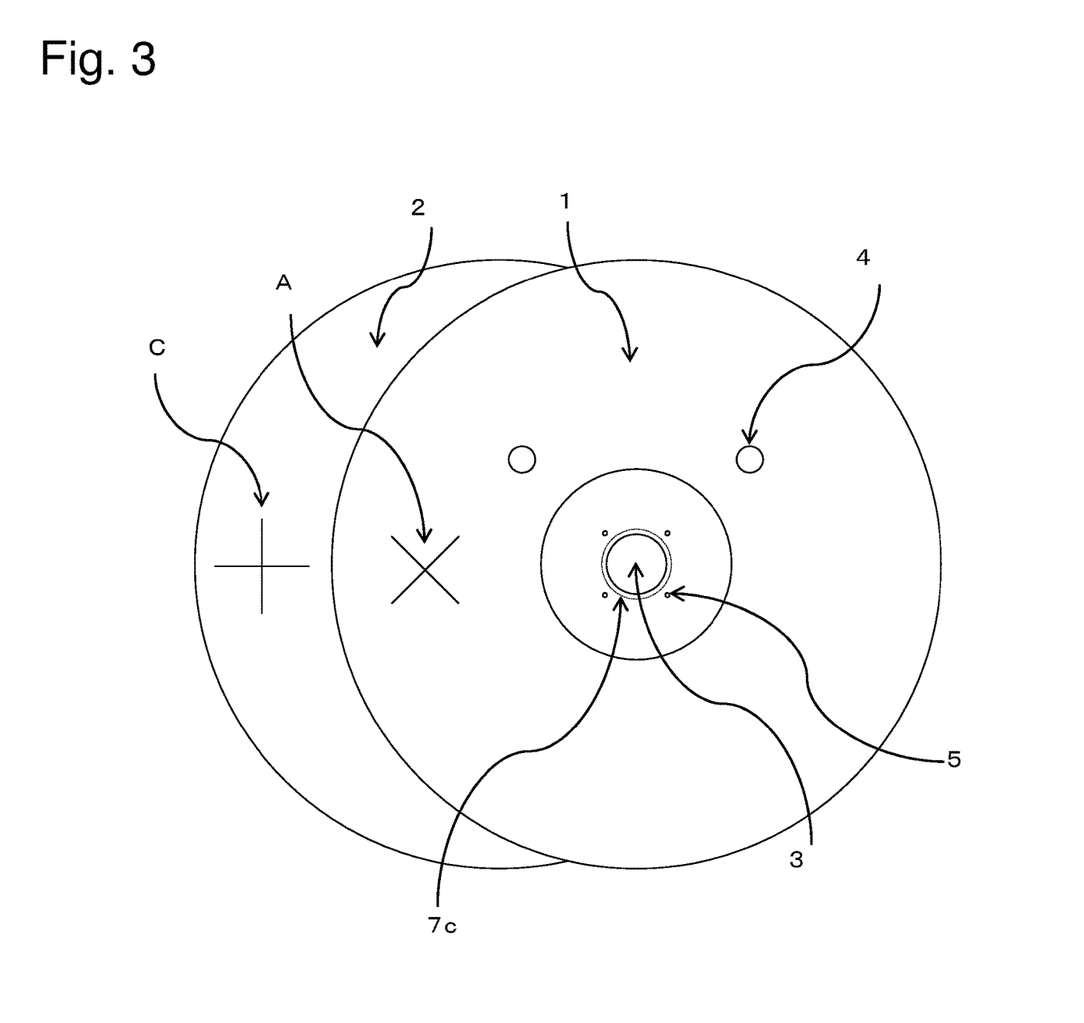
FIG. 3 is a front view showing the manner in which the mounting port-side main body base cloth of the air bag for evaluation and an occupant-side main body base cloth are stacked.
Figure 4:
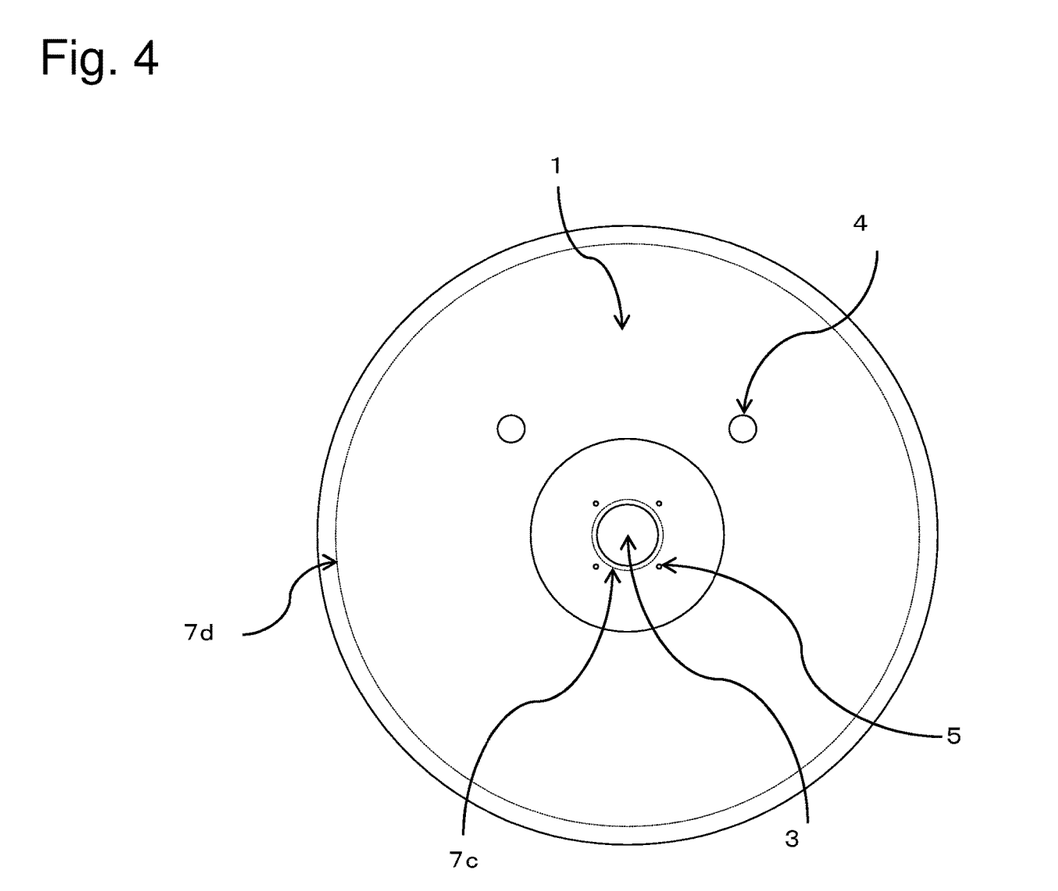
FIG. 4 is a front view showing a state in which the mounting port-side main body base cloth of the air bag for evaluation and the occupant-side main body base cloth are sewn together.

Then, the two main body base cloths 1 and 2 were stacked such that the surfaces of the main body base cloths, with which the pieces of annular cloth 6a and 6b were seamed, were located outside and the weaving direction of the main body base cloth 1 was rotated by 45 degrees with respect to the weaving direction of the main body base cloth 2 (FIG. 3). Here, A shown in FIG. 3 indicates the weaving direction of the first main body base cloth 1 and C indicates the weaving direction of the second main body base cloth 2. Furthermore, outer circumferential portions of the overlaid first and second main body base cloths were sewn together through double yarn chain stitching with two rows (sewn portion 7d) at a distance between stitch lines of 2.4 mm and a margin to the seam of 13 mm. The sewn state is shown in FIG. 4. The bag was drawn out from the mounting port 3, and the inside and the outside were inverted after sewing so as to obtain a circular air bag having an inner diameter ø of 676 mm. A sewing thread that was the same as the above-described thread used in lock stitching was used as the sewing thread for sewing the outer circumferential portions.

Air Bag Deployment Test

An inflator was inserted into the air bag that was produced using the above-described method, the air bag was folded from the right and left, and the top and bottom so as to overlap itself at the position of the inflator, and the folded air bag was fixed to a stand for evaluation using a bolt, and then fixed using apiece of tape (NICHIBAN cloth adhesive tape No. 121) such that the fold did not come undone. The inflator was ignited in this state so as to deploy the air bag. An EH5-200 inflator manufactured by Daicel Corporation was used as the inflator. An evaluation was made by measuring the internal pressure at the time of deployment and visually checking the occurrence of damage to sewn portions. Criteria for evaluating the internal pressure was set such that the case where the maximum internal pressure at a secondary peak in the deployment test was 35 kPa or more was evaluated as "A", and the case where the maximum internal pressure at a secondary peak in the deployment test was less than 35 kPa was evaluated as "B". Also, the criteria for evaluating damage to sewn portions were set such that the case where no melting was recognized was evaluated as "A", the case where partial melting was recognized and a connection to an adjacent portion was not recognized was evaluated as "B", and the case where melting and a connection to an adjacent portion were recognized was evaluated as "C".

Working Example 1

A plain woven fabric was produced using polyethylene terephthalate yarns having a total fineness of 470 dtex, a filament number of 182, and a single fiber fineness of 2.58 dtex for the warp and the weft, and scouring and setting were performed so as to obtain a fabric in which the warp had a weave density of 62/2.54 cm and the weft had a weave density of 60/2.54 cm. The obtained fabric had a cover factor of 2645, and the height difference between recesses and protrusions on the surface was 121 μm. When the air permeability of this fabric was measured, the fabric had a very low air permeability of 0.12 mL/cm$^2$·sec obtained using a Frazier method, and had an appropriate P ratio of 1.08. Also, an air bag for evaluation was produced using this fabric, and when a deployment test was performed, the maximum internal pressure at a secondary peak exhibited a sufficient internal pressure of 43 kPa, and the air bag for evaluation exhibited low air permeability even under high-temperature conditions. Also, the air bag had very good heat resistance because damage to the sewn portions was not recognized.

Working Example 2

A plain woven fabric was produced using polyethylene terephthalate yarns having a total fineness of 470 dtex, a filament number of 144, and a single fiber fineness of 3.26 dtex for the warp and the weft, and scouring and setting were performed so as to obtain a fabric in which the warp had a weave density of 62/2.54 cm and the weft had a weave density of 59/2.54 cm. The obtained fabric had a cover factor of 2623, and the height difference between recesses and protrusions on the surface was 128 μm. When the air permeability of this fabric was measured, the fabric had a very low air permeability of 0.12 mL/cm$^2$·sec obtained using a Frazier method, and had an appropriate P ratio of 0.93. Also, an air bag for evaluation was produced using this fabric, and when a deployment test was performed, the maximum internal pressure at a secondary peak exhibited a sufficient internal pressure of 41 kPa, and the air bag for evaluation exhibited low air permeability even under high-temperature conditions. Also, with regard to sewn portions, the air bag had good heat resistance because it was observed that only some of the sewn portions were slightly melted.

Working Example 3

A plain woven fabric was produced using polyethylene terephthalate yarns having a total fineness of 470 dtex, a filament number of 182, and a single fiber fineness of 2.58 dtex for the warp and the weft, and scouring and setting were performed so as to obtain a fabric in which both the warp and the weft had a weave density of 55/2.54 cm. The obtained fabric had a cover factor of 2385, and the height difference between recesses and protrusions on the surface was 102 μm. When the air permeability of this fabric was measured, the fabric had an air permeability of 0.39 mL/cm$^2$ sec obtained using a Frazier method, which met the performance of an air bag, and the fabric had an appropriate P ratio of 1.07. Also, an air bag for evaluation was produced using this fabric, and when a deployment test was performed, the maximum internal pressure at a secondary peak exhibited a sufficient internal pressure of 38 kPa despite being slightly lower than those of Working Examples 1 and 2, and the air bag for evaluation exhibited low air permeability even under high-temperature conditions. Also, the air bag had very good heat resistance because damage to the sewn portions was not recognized.

Working Example 4

A plain woven fabric was produced using polyethylene terephthalate yarns having a total fineness of 470 dtex, a filament number of 144, and a single fiber fineness of 3.26 dtex for the warp and the weft, and scouring and setting were performed so as to obtain a fabric in which both the warp and the weft had a weave density of 55/2.54 cm. The obtained fabric had a cover factor of 2385, and the height difference between recesses and protrusions on the surface was 108 μm. When the air permeability of this fabric was measured, the fabric had an air permeability of 0.49 mL/cm$^2$ sec obtained using a Frazier method, which met the performance of an air bag. Also, an air bag for evaluation was produced using this fabric, and when a deployment test was performed, the maximum internal pressure at a secondary peak exhibited a sufficient internal pressure of 36 kPa despite being lower than those of Working Examples 1 and 2, and the air bag for evaluation exhibited low air permeability even under high-temperature conditions. Also, with regard to sewn portions, the air bag had good heat resistance because it was observed that only some of the sewn portions were slightly melted.

Comparative Example 1

A plain woven fabric was produced using polyethylene terephthalate yarns having a total fineness of 470 dtex, a filament number of 120, and a single fiber fineness of 3.92 dtex for the warp and the weft, and scouring and setting were performed so as to obtain a fabric in which the warp had a weave density of 61/2.54 cm and the weft had a weave density of 54/2.54 cm. The obtained fabric had a cover factor of 2493, and the height difference between recesses and protrusions on the surface was slightly large at 132 μm. When the air permeability of this fabric was measured, the fabric had a sufficient air permeability of 0.36 mL/cm$^2$·sec obtained using a Frazier method, but the fabric had a low P ratio of 0.82. Also, an air bag for evaluation was produced using this fabric, and when a deployment test was performed, the maximum internal pressure at a secondary peak was low at 32 kPa, which suggested that air permeability decreased under high-temperature conditions. Also, it was confirmed that connected melting holes were formed in sewn portions, and the air bag had very low heat resistance.

Comparative Example 2

A plain woven fabric was produced using polyethylene terephthalate yarns having a total fineness of 560 dtex, a filament number of 96, and a single fiber fineness of 5.83 dtex for the warp and the weft, and scouring and setting were performed so as to obtain a fabric in which the warp had a weave density of 55/2.54 cm and the weft had a weave density of 51/2.54 cm. The obtained fabric had a cover factor of 2508, and the height difference between recesses and protrusions on the surface was large at 143 μm. When the air permeability of this fabric was measured, the fabric had a sufficient air permeability of 0.22 mL/cm²·sec obtained using a Frazier method, but the fabric had a large P ratio of 1.41. Also, an air bag for evaluation was produced using this fabric, and when a deployment test was performed, damage to the sewn portions was not observed and the air bag for evaluation had good heat resistance, but the maximum internal pressure at a secondary peak exhibited a low internal pressure of 28 kPa, which suggested that air permeability decreased under high-temperature conditions.

The invention claimed is:

1. A non-coated air bag fabric,
   wherein the fabric is woven using fibers constituted by synthetic fibers,
   the fabric has a cover factor of 2300 or more,
   a height difference between a recess and a protrusion on a surface of the fabric is less than 130 μm,
   a single fiber fineness of the fabric is 2.5 to 3.5 dtex, and
   a P ratio expressed by an equation below is 0.85 to 1.15 inclusive, the $P$ ratio $= HP_{100}/HP_{80}$, where $HP_{80}$ indicates air permeability after a load is applied to the fabric under a condition of 80° C., and $HP_{100}$ indicates air permeability after a load is applied to the fabric under a condition of 100° C.

2. The non-coated air bag fabric according to claim 1, wherein the cover factor is 2550 or more, and
   the height difference is 120 μm or more.

3. The non-coated air bag fabric according to claim 1, wherein the cover factor is less than 2500, and
   the height difference is less than 115 μm.

4. The non-coated air bag fabric according to claim 1, wherein the synthetic fibers are polyester fibers.

TABLE 1

|  |  | Work. Ex. 1 | Work. Ex. 2 | Work. Ex. 3 | Work. Ex. 4 | Comp. Ex. 1 | Comp. Ex. 2 |
|---|---|---|---|---|---|---|---|
| Material |  | PET | PET | PET | PET | PET | PET |
| Total fineness | dtex | 470 | 470 | 470 | 470 | 470 | 560 |
| Filament number | — | 182 | 144 | 182 | 144 | 120 | 96 |
| Single fiber fineness | dtex | 2.58 | 3.26 | 2.58 | 3.26 | 3.92 | 5.83 |
| Weave density  Warp | #/2.54 cm | 62 | 62 | 55 | 55 | 61 | 55 |
| Weft | #/2.54 cm | 60 | 59 | 55 | 55 | 54 | 51 |
| Cover factor | — | 2645 | 2623 | 2385 | 3385 | 2493 | 2508 |
| Thickness | mm | 0.309 | 0.310 | 0.289 | 0.290 | 0.308 | 0.333 |
| Height difference | μm | 121 | 128 | 102 | 108 | 132 | 143 |
| Air permeability/ Frazier method | ml/cm²·sec | 0.10 | 0.12 | 0.39 | 0.49 | 0.36 | 0.22 |
| HP80 | ml/cm²·sec | 0.18 | 0.22 | 0.45 | 0.50 | 0.44 | 0.27 |
| HP100 | ml/cm²·sec | 0.195 | 0.205 | 0.48 | 0.46 | 0.36 | 0.38 |
| P ratio | — | 1.08 | 0.93 | 1.07 | 0.92 | 0.82 | 1.41 |
| Deployment test  Max. at secondary peak | kPa | 43 | 41 | 38 | 36 | 32 | 28 |
| Evaluation of internal pressure | — | A | A | A | A | B | B |
| Damage to sewn portion | — | A | B | A | B | C | A |

LIST OF REFERENCE NUMERALS

1 Mounting port-side main body base cloth
2 Occupant-side main body base cloth
3 Inflator mounting port
4 Air outlet
5 Bolt fixing hole
6a, 6b Annular cloth
7a, 7b, 7c, 7d Sewn portion
A Weaving direction of main body base cloth 1
B Weaving direction of annular cloth 6a
C Weaving direction of main body base cloth 2

5. The non-coated air bag fabric according to claim 1, wherein the synthetic fibers are made of polyethylene terephthalate.

6. An air bag, which is formed by at least one piece of main body base cloth formed by the non-coated air bag fabric according to claim 1.

7. The air bag fabric according to claim 6, comprising:
   at least two pieces of the main body base cloth; and
   a thread for sewing together edges of the pieces of the main body base cloth.

* * * * *